United States Patent
Ko et al.

(10) Patent No.: US 10,346,482 B1
(45) Date of Patent: *Jul. 9, 2019

(54) CONTEXT- AND ACTIVITY-AWARE CONTENT SELECTION

(71) Applicant: Answerdash Inc., Seattle, WA (US)

(72) Inventors: Andrew Ko, Seattle, WA (US); Victor Medina, Seattle, WA (US)

(73) Assignee: ANSWERDASH INC., Seattle, WA (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/657,780

(22) Filed: Jul. 24, 2017

Related U.S. Application Data

(63) Continuation of application No. 15/066,974, filed on Mar. 10, 2016, now Pat. No. 9,727,561.

(60) Provisional application No. 62/131,218, filed on Mar. 10, 2015.

(51) Int. Cl.
*G06F 16/93* (2019.01)
*G06F 17/21* (2006.01)
*G06F 16/2457* (2019.01)

(52) U.S. Cl.
CPC ........ *G06F 16/93* (2019.01); *G06F 16/24578* (2019.01); *G06F 17/212* (2013.01)

(58) Field of Classification Search
CPC ............. G06F 17/30011; G06F 17/212; G06F 17/3053
See application file for complete search history.

(56) References Cited

U.S. PATENT DOCUMENTS

2002/0091993 A1* 7/2002 Walley .................... G06F 9/453 717/120
2016/0239487 A1* 8/2016 Potharaju .......... G06F 16/24578

* cited by examiner

*Primary Examiner* — Asher D Kells
(74) *Attorney, Agent, or Firm* — RowanTELS LLC

(57) ABSTRACT

A method of contextual activity awareness content selection operates a switch to release a document viewer activation control to a first selector, operate the first selector to select the application location for the application interface, selects document view logs, associated with application location, operates document prioritization logic to calculates average document view rate, calculates an average view rate for each document at the application location, normalizes, weights, and rank average view rates document relevance set, operates a second selector to select matching documents and release to the document viewer, configures the document viewer to prioritize rendering based on document relevance set, operates the switch to release a document view signal to a compiler, in response to a document viewing in the document viewer, and operates the compiler to generate a new document view entry for the document viewing.

12 Claims, 16 Drawing Sheets

US 10,346,482 B1

CONTEXT- AND ACTIVITY-AWARE CONTENT SELECTION

BACKGROUND

Software applications often display content to users that might be helpful in using the application, including links to knowledge base articles, discussion forums, or help centers. Unfortunately, when there is an abundance of help content (e.g., knowledge bases can have hundreds to thousands of articles), to provide relevant content, application designers must either 1) manually select which content appears in which places in an application, 2) provide a search option to allow users to find relevant content, or 3) use some computer-based content selection method to decide which content is most relevant to display in particular situations.

In the case of automated content selection, there is a wide range of information that might be taken into account to decide what content to display. Prior art teaches of methods that segregate software applications into different screens, providing content that is specific to the screen, requiring each piece of content to be annotated with the screen to which it applies. Other prior art teaches of methods that track which content is accessed most frequently by application users, selecting only the most viewed content for display. Other methods track a specific individual user's activity, using aspects of the application that the user has engaged with to identify content that is related to those aspects.

There exists a need for methods that can combine existing prior art with the data about all of the users of an application to select the most relevant content.

BRIEF SUMMARY

In some embodiments, a machine tracking system may include a digital document viewer; logic to identify an application location corresponding to activation of the digital document viewer; a clock; a database; logic to transform the each of the group of document view log entries into an average rate of document views at the application location corresponding to activation of the digital document viewer; logic to determine a baseline rate of document view activity for the application location corresponding to activation of the digital document viewer from the average rate of document views at the application location corresponding to activation of the digital document viewer; logic to determine, for each document of a group of documents represented in the group of document view log entries, an average time interval between views of the each document of a group of documents represented in the group of document view log entries at the application location corresponding to activation of the digital document viewer; logic to normalize the average time interval between views according to the baseline rate of document view activity for the application location corresponding to activation of the digital document viewer to produce a normalized view interval; logic to weight the normalized view interval according to a sigmoidal function based on a time since the digital document rendered by the digital document viewer was last viewed to produce a relevance score for the digital document rendered by the digital document viewer; and/or logic to position a first selector for the digital document rendered by the digital document viewer in a user presentation according to the relevance score for the digital document rendered by the digital document viewer.

In some embodiments, the database may include a document view log that may include a group of document view log entries.

In some embodiments, each of the group of document view log entries may include a document id corresponding to a digital document rendered by the digital document viewer, the application view location corresponding to activation of the digital document viewer, and a timestamp from the clock.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Figure 1:
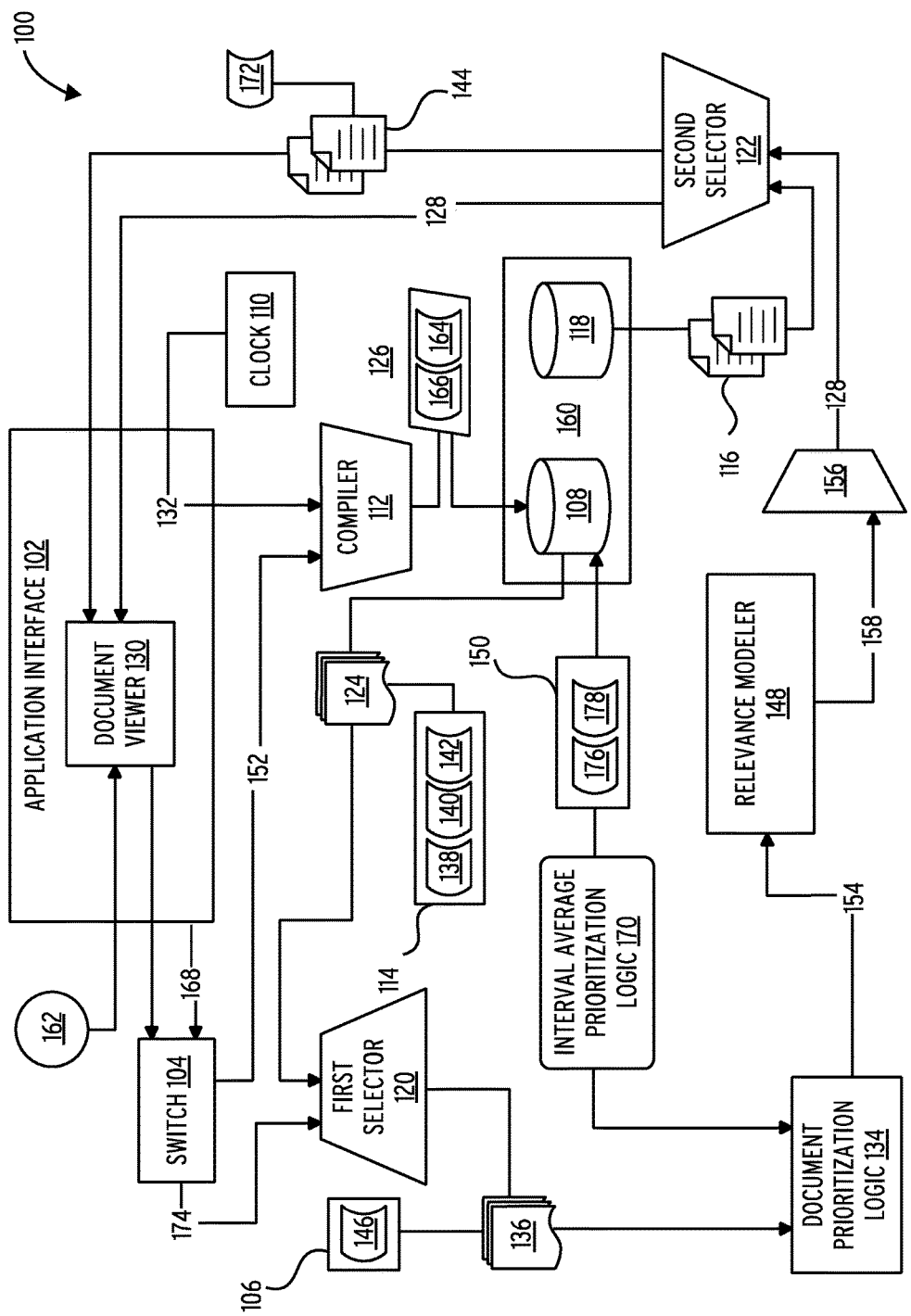
FIG. 1 illustrates an embodiment of a contextual activity awareness content selection system 100.

In some embodiments a method of contextual activity awareness content selection may include operating a switch to release a document viewer activation control to a first selector, in response to receiving an activation input for a document viewer through an application interface; configuring the first selector with the document viewer activation control; configuring the document prioritization logic with the document view logs; configuring the second selector with the document relevance set; configuring the document viewer with the document relevance set to prioritize rendering of each document based on associated rank of the relevancy scores; operating the switch to release a document view signal to a compiler, in response to a document viewing in the document viewer. The configured first selector selects the application location for the application interface from the document viewer activation control; selects document view logs, each associated with a document identifier, with document view entries each including time stamp, and view location matching the application location, from a view log memory allocation of a controlled memory structure; and/or release the document view logs to document prioritization logic. The configured document prioritization logic calculates average document view rate for the application location from time stamp intervals between the document view entries; calculates an average view rate for each document of a plurality of documents at the application location from the time stamp intervals between the document view entries for each of the plurality of documents; normalizes the average view rate for each document with the average document view rate; weights normalized average view rates through operation of a relevance modeler to generate relevancy scores; operates a combiner to rank the relevancy scores in descending order and combine in a document relevance set; and/or release the document relevance set to a second selector. The configured second selector selects the plurality of documents, from a document collection memory allocation in the controlled memory structure, with matching document identifiers to the relevancy scores; and/or releases each document and the document relevance set to the document viewer in the application interface. The configured compiler identifies a document view log for a viewed document, through the matching document identifiers, in the view log memory allocation; generates a new document view entry for the document viewing in the document view log; appends the application location of the application interface during the document viewing in the new document view entry as the view location; and/or records a new time stamp from a clock in the new document view entry for the document viewing.

In some embodiments the method of contextual activity awareness content selection may include operating an interval average prioritization logic to: configure the document prioritization logic to prioritize interval average sets including a current interval average document view rate and a current interval average view rate in the document view logs; map unique application locations in the document view logs of the view log memory allocation; release a sub process activation control to a scheduled sub process in response to detecting an interval lapse from the clock; and/or operate the scheduled sub process, in response to receiving the sub process activation control. The scheduled sub process calculates the average document view rate for each unique application location from the time stamp intervals between the document view entries; calculates the average view rate for each document at each unique application location from the time stamp intervals between the document view entries for each document; appends the average document view rate for each unique application location as the current interval average document view rate to the document view logs with at least one document view entry with the view location matching the application location; and/or appends the average view rate for each document at each unique application location as the current interval average view rate, to the document view logs with the matching document identifiers.

In some embodiments method of contextual activity awareness content selection may include configuring the document prioritization logic with the document view logs to: normalize the current interval average view rate for each document with the current interval average document view rate; weight normalized current interval average view rates through operation of the relevance modeler to generate the relevancy scores; operate the combiner to rank the relevancy scores in descending order and combine in the document relevance set; and/or release the document relevance set to the second selector.

In some embodiments method of contextual activity awareness content selection may configure the application location is a uniform resource locator (URL) to include a domain, a path, and a query value.

In some embodiments the method of contextual activity awareness content selection may include configuring the relevance modeler with the query value, to: parse the query value to identify at least one context value node through comparison with a context value node tree; determine context value branches for the at least one context value node in the context value node tree; identify a comparable context value branch for each document and apply a similarity metric based in part on homology; and/or rank similarity metrics for each document and apply rank weight metric to the normalized average view rates based in part on rank position of the similarity metrics.

In some embodiments, an application may provide a control such as a floating help button that a user may invoke to request relevant content. Many alternative embodiments for providing access to documents in an application are possible, including interfaces that allow users to search for documents, browsing views of all documents, tools for communicating with other users online to find helpful content, or explicit links to documents in the application itself. The present method does not depend on the method by which documents are retrieved, but that viewing the document is a discrete, observable event.

In some embodiments, an application may provide a control such as a floating help button that a user may invoke to request relevant content. Many alternative embodiments for providing access to documents in an application are possible, including interfaces that allow users to search for documents, browsing views of all documents, tools for communicating with other users online to find helpful content, or explicit links to documents in the application itself. The present method does not depend on the method by which documents are retrieved, but hat viewing the document is a discrete, observable event.

In some embodiments, the application locations may be defined in a variety of ways. In an embodiment, location may be determined by a web page's uniform resource locator (URL) or by a unique identifier associated with an application screen (as is often assigned when building an application's user interface). Other embodiments define location according to physical geolocation, the visual structure of the content on an application screen, or the textual content on the application screen. The present method does not depend on how location is defined, but that locations are discrete and may be identified unambiguously.

In some embodiments, each time a document is viewed in an application location, a document view event is logged according to timestamp and application location. A user might click on a document title to request the full document or select a link to the document. When this event occurs, via whatever means, the document view is logged.

When an application user requests relevant documents at a particular application location, the system uses the log of document views, and the user's current application location to determine which documents are likely to be most relevant to the user. First, the system determines average time between document views at the application location to establish a baseline rate of document view activity. Then, for each document in the collection, the system determines the average time interval between views of the document at the application location, normalizing the average view interval according to the baseline rate determined above. Then, the normalized view interval is weighted according to a sigmoidal function based on the time since when the document was last viewed. These calculations result in a relevance score for each document based on how frequently and recently it was viewed at the application location. Documents that are viewed recently and/or frequently get the highest scores. In an embodiment, documents that were not viewed at the current application location are not included in scoring. In alternative embodiments, these non-viewed documents might be included, e.g. with lower weighting on the score.

In some embodiments using the relevance scores, the system sorts the documents in descending score order, resulting in a list of the most viewed questions for the application location. In an embodiment, the documents are displayed in this descending order atop the application screen, showing an application user which documents other visitors have viewed at this location. In alternative embodiments, a new screen might be shown to display the sorted list of relevant documents, or the documents might be displayed on a different device.

In alternative embodiments, other context- or activity-sensitive factors may influence the scoring of relevant documents. For instance, metadata of the documents such as indicators of its helpfulness or importance could influence the weighting of relevant documents. Information about documents that an application user has previously viewed might also influence scoring, excluding documents that the user has viewed, or preferring documents that are related to documents that the user has viewed. Documents might be related by metadata about the document topics or by explicit links between documents, either in the document content, or as metadata for linking related documents.

In some embodiments the system may include a document store, viewer, clock, locator, view log, interval timer, normalizer, sigmoidal weighting, and sorter. The viewer receives a document from the document store and in response renders the document on a machine interface for user viewing of the document. Due to configured interactions between the various system components, this initiates additional actions and processing.

In some embodiments the locator receives an event signal from the viewer and in response generates a location indication. The clock receives an event signal from the viewer and in response generates a time indication. The location and time indications are communicated to an event log. The view log also receives a doc id signal from the viewer and in response adds an entry for the doc id to the view log, including the time and location.

In some embodiments the interval timer receives view records from the view log and in response determines time intervals between the view records and applies the intervals to a baseline rate and average interval. The normalizer receives a baseline rate from the interval timer. The normalizer also receives an average interval from the interval timer and in response applies the average interval and baseline rate to determine the normal interval. This normal interval is then subjected to weighting.

In some embodiments the sigmoidal weighting module receives the normal interval from the normalizer and in response determines weights to associate with the normal interval, producing a location specific relevance for one or more documents. The sigmoidal weighting may also receive metadata from the document store and apply these to the weights for the location specific relevance score(s). The sorter receives a location specific relevance score signal from the sigmoidal weighting and in response sorts documents by location specific relevance.

DRAWINGS

FIG. 1 illustrates and embodiment of a contextual activity awareness content selection system 100.

The contextual activity awareness content selection system 100 comprises an application interface 102, a switch 104, a first selector 120, a document prioritization logic 134, an interval average prioritization logic 170, a relevance modeler 148, a controlled memory structure 160, a combiner 156, a second selector 122, a clock 110, and a compiler 112. The application interface 102 comprises a document viewer 130, and an application location 168. The document viewer 130 comprises an activation input 162. The controlled memory structure 160 comprises a view log memory allocation 108 and a document collection memory allocation 118. The view log memory allocation 108 comprises document view logs 124. The document view logs 124 comprise document view entries 114 and a new document view entry 126. The document view entries 114 each comprise, in part by association, a document identifier 138 a time stamp 140, and a view location 142. The new document view entry 126 comprises a time stamp 166 and a view location 164. The switch 104 comprises a document viewer activation control 174. The first selector 120 comprises selected document view logs 136. The selected document view logs 136 comprise document view entries 106, each comprising matching view location 146. The document view logs 124 comprise interval average sets 150. The interval average sets 150 comprise a current interval average view rate 176 and a current interval average document view rate 178. The document prioritization logic 134 comprises normalized average view rates 154. The relevance modeler 148 comprises relevancy scores 158. The combiner 156 comprises document relevance set 128. The document collection memory allocation 118 comprises a plurality of documents 116. The second selector 122 comprises a document relevance set 128 and a plurality of documents 144 comprising matching document identifier 172. The compiler 112 comprises a new time stamp 132 and a document view signal 152.

The contextual activity awareness content selection system 100 may be implemented in accordance the processes described in FIG. 2, FIG. 3, FIG. 5, FIG. 7, FIG. 8, FIG. 10, FIG. 11, and FIG. 13.

Figure 2:
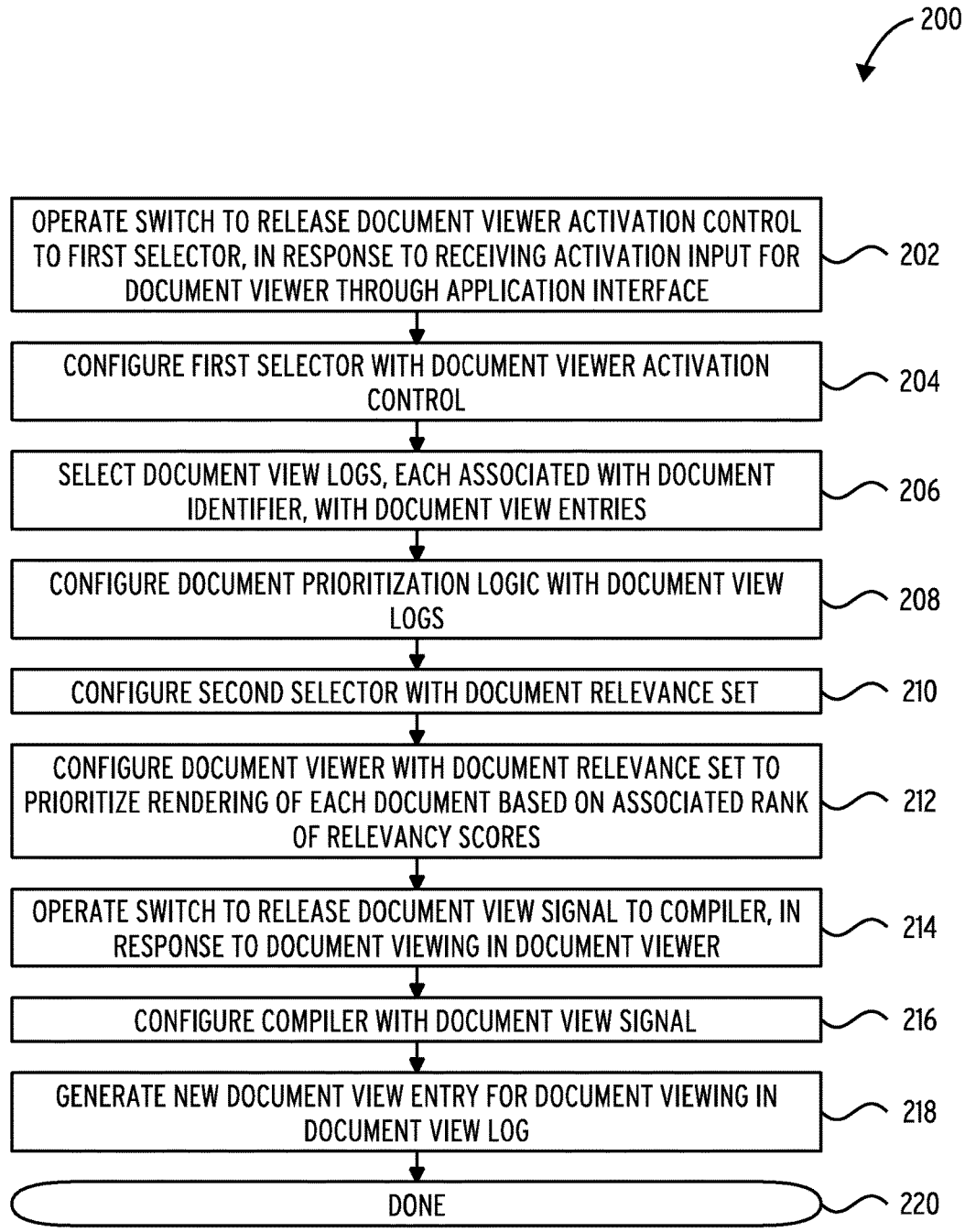
FIG. 2 illustrates an embodiment of a contextual activity awareness content selection process 200.

FIG. 2 illustrates an embodiment of a contextual activity awareness content selection process 200. In block 202, contextual activity awareness content selection process 200 operates a switch to release a document viewer activation control to a first selector, in response to receiving an activation input for a document viewer through an application interface. In block 204, contextual activity awareness content selection process 200 configures the first selector with the document viewer activation control. In block 206, contextual activity awareness content selection process 200 selects document view logs, each associated with a document identifier, having document view entries. In block 208, contextual activity awareness content selection process 200 configures the document prioritization logic with the document view logs. In block 210, contextual activity awareness content selection process 200 configures the second selector with the document relevance set. In block 212, contextual activity awareness content selection process 200 configures the document viewer with the document relevance set to prioritize rendering of each document based on associated rank of the relevancy scores. In block 214, contextual activity awareness content selection process 200 operates the switch to release a document view signal to a compiler, in response to a document viewing in the document viewer. In block 216, contextual activity awareness content selection process 200 configures the compiler with the document view signal. In block 218, contextual activity awareness content selection process 200 generates a new document view entry for a document viewing in a document view log. In done block 220, contextual activity awareness content selection process 200 ends.

Figure 3:
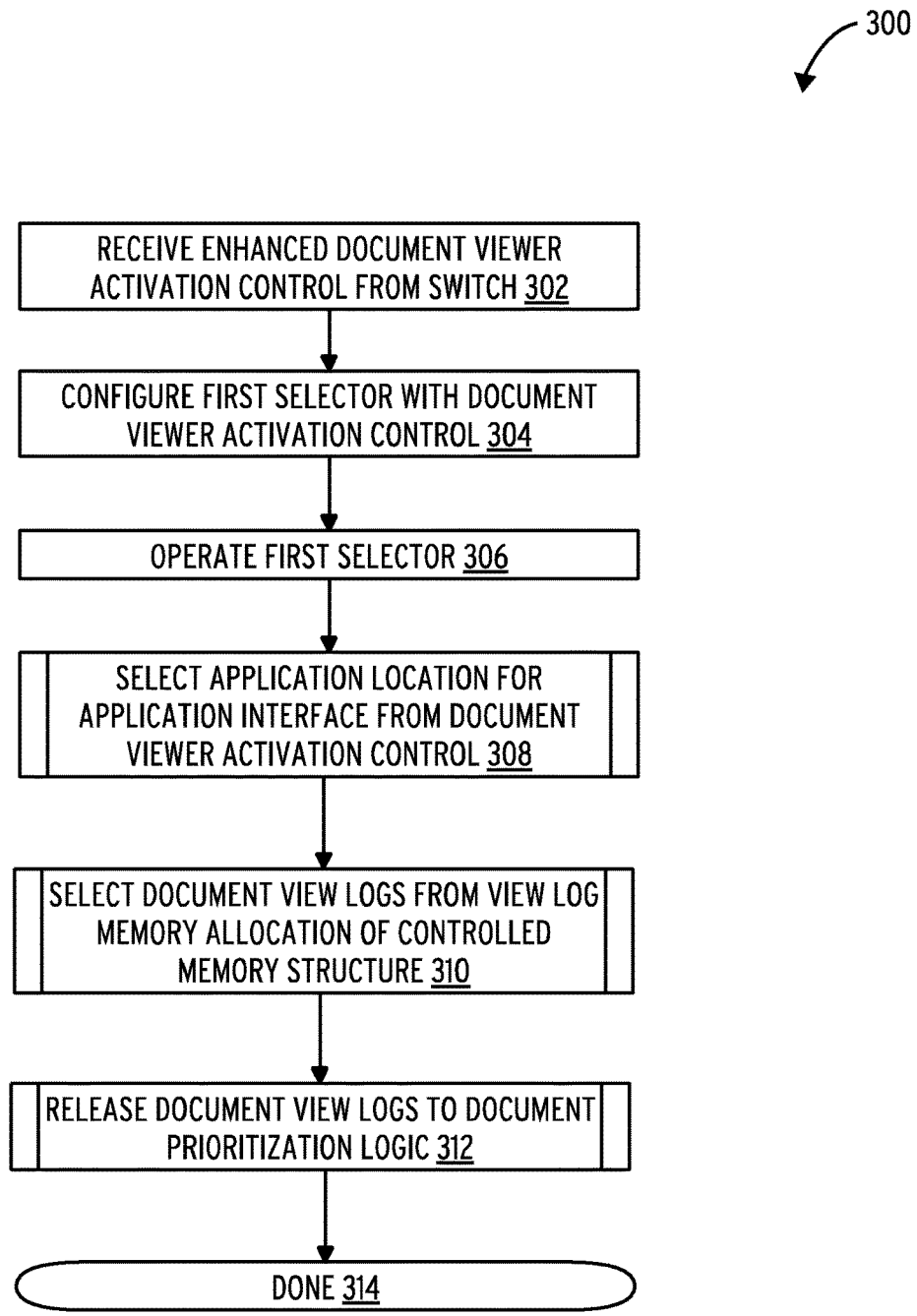
FIG. 3 illustrates an embodiment of a first selector sub process 300.

FIG. 3 illustrates an embodiment of a first selector sub process 300. In block 302, first selector sub process 300 receives enhanced document viewer activation control from a switch. In block 304, first selector sub process 300 configures the first selector with the document viewer activation control. In block 306, first selector sub process 300 operates the first selector. In subroutine block 308, first selector sub process 300 selects an application location for the application interface from the document viewer activation control. In subroutine block 310, first selector sub process 300 selects document view logs from a view log memory allocation of a controlled memory structure. In subroutine block 312, first selector sub process 300 releases the selected document view logs to document prioritization logic. In done block 314, first selector sub process 300 ends.

Figure 4:
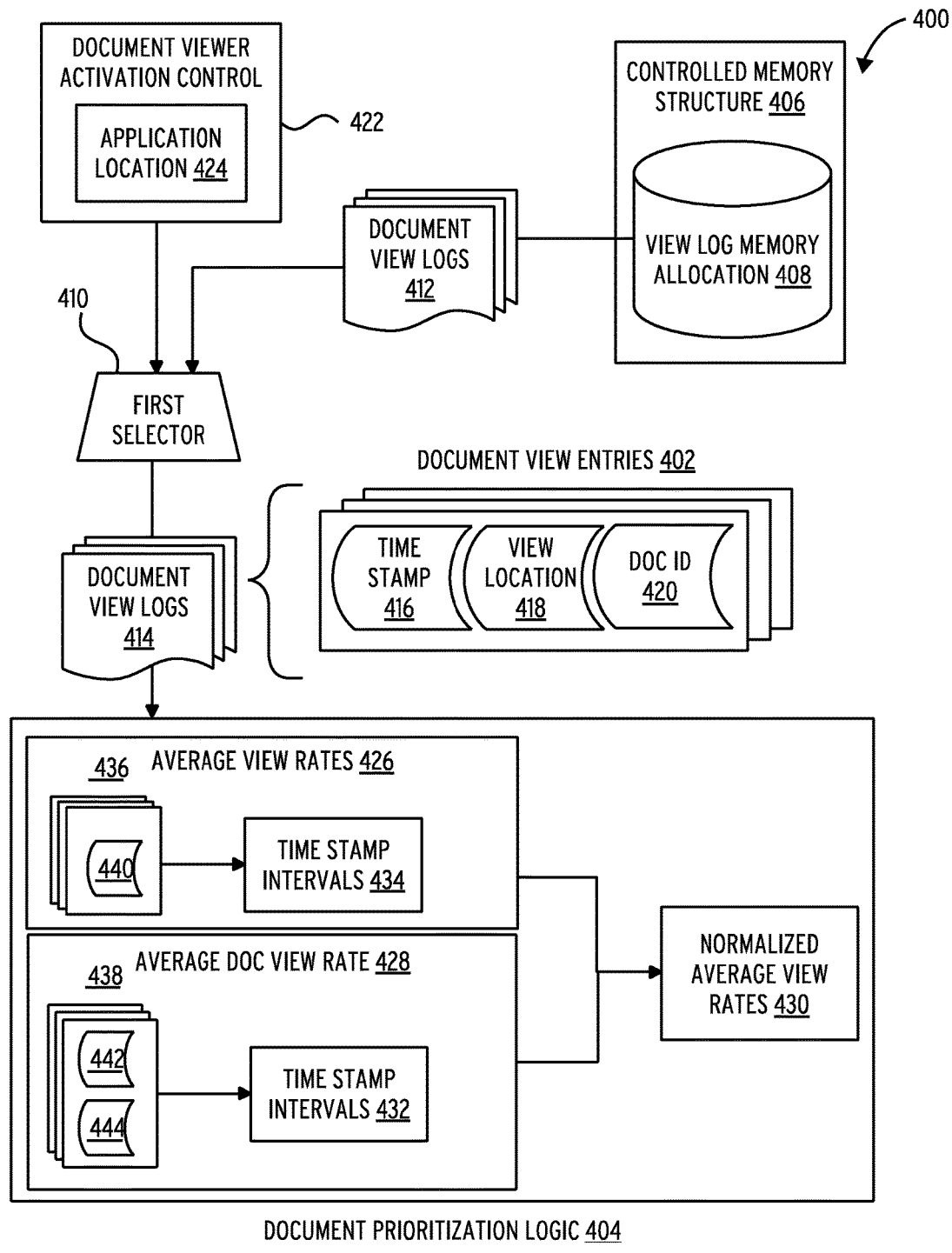
FIG. 4 illustrates an embodiment of a document prioritization logic sub system 400.

FIG. 4 illustrates an embodiment of a document prioritization logic sub system 400. The document prioritization logic sub system 400 comprises a controlled memory structure 406, a document viewer activation control 422, a first selector 410, and a document prioritization logic 404. The controlled memory structure 406 comprises a view log memory allocation 408. The view log memory allocation 408 comprises document view logs 412. The document viewer activation control 422 comprises an application location 424. The first selector 410 comprises selected document view logs 414 each comprising document view entries 402. Each of the document view entries 402 comprise a time stamp 416, a matching view location 418, and a document identifier 420. The document prioritization logic 404 comprises average view rates 426, average document view rate 428, and normalized average view rates 430. The average view rates 426 comprises time stamp intervals 434 from document view entries 436. The document view entries 436 comprise time stamps 440. The average document view rate 428 comprises time stamp intervals 432 from document view entries 438 comprising time stamps 442 and same document identifier 444.

Figure 5:
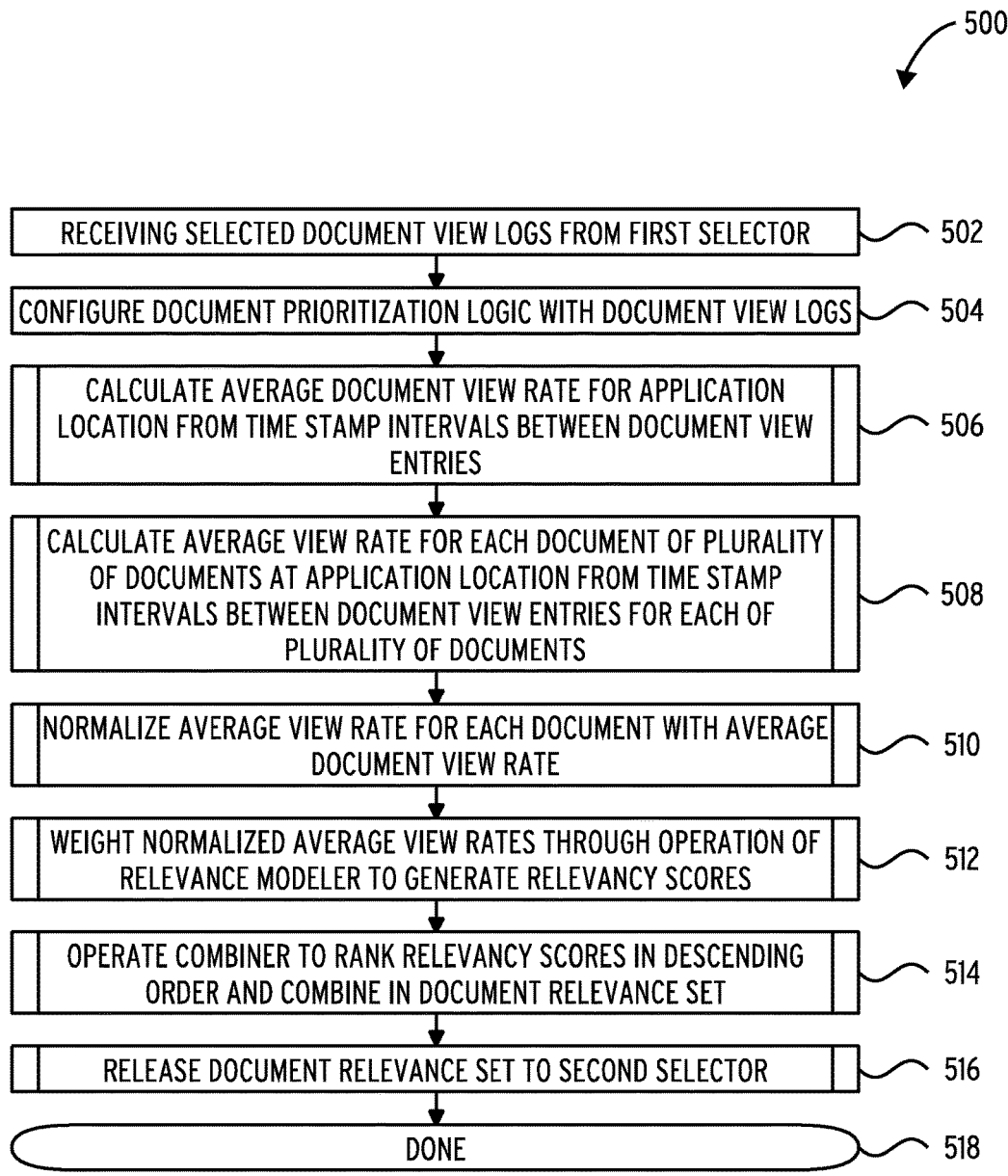
FIG. 5 illustrates an embodiment of a document prioritization logic sub process 500.

The document prioritization logic sub system 400 may be implemented in accordance with the process described in FIG. 5.

FIG. 5 illustrates an embodiment of a document prioritization logic sub process 500. In block 502, document prioritization logic sub process 500 receiving selected document view logs from the first selector. In block 504, document prioritization logic sub process 500 configures the document prioritization logic with the document view logs. In subroutine block 506, document prioritization logic sub process 500 calculates average document view rate for the application location from time stamp intervals between the document view entries. In subroutine block 508, document prioritization logic sub process 500 calculates an average view rate for each document of a plurality of documents at the application location from the time stamp intervals between the document view entries for each of the plurality of documents. In subroutine block 510, document prioritization logic sub process 500 normalizes the average view rate for each document with the average document view rate. In subroutine block 512, document prioritization logic sub process 500 weights normalized average view rates through operation of a relevance modeler to generate relevancy scores. In subroutine block 514, document prioritization logic sub process 500 operates a combiner to rank the relevancy scores in descending order and combine them into a document relevance set. In subroutine block 516, document prioritization logic sub process 500 releases the document relevance set to a second selector. In done block 518, document prioritization logic sub process 500 ends.

Figure 6:
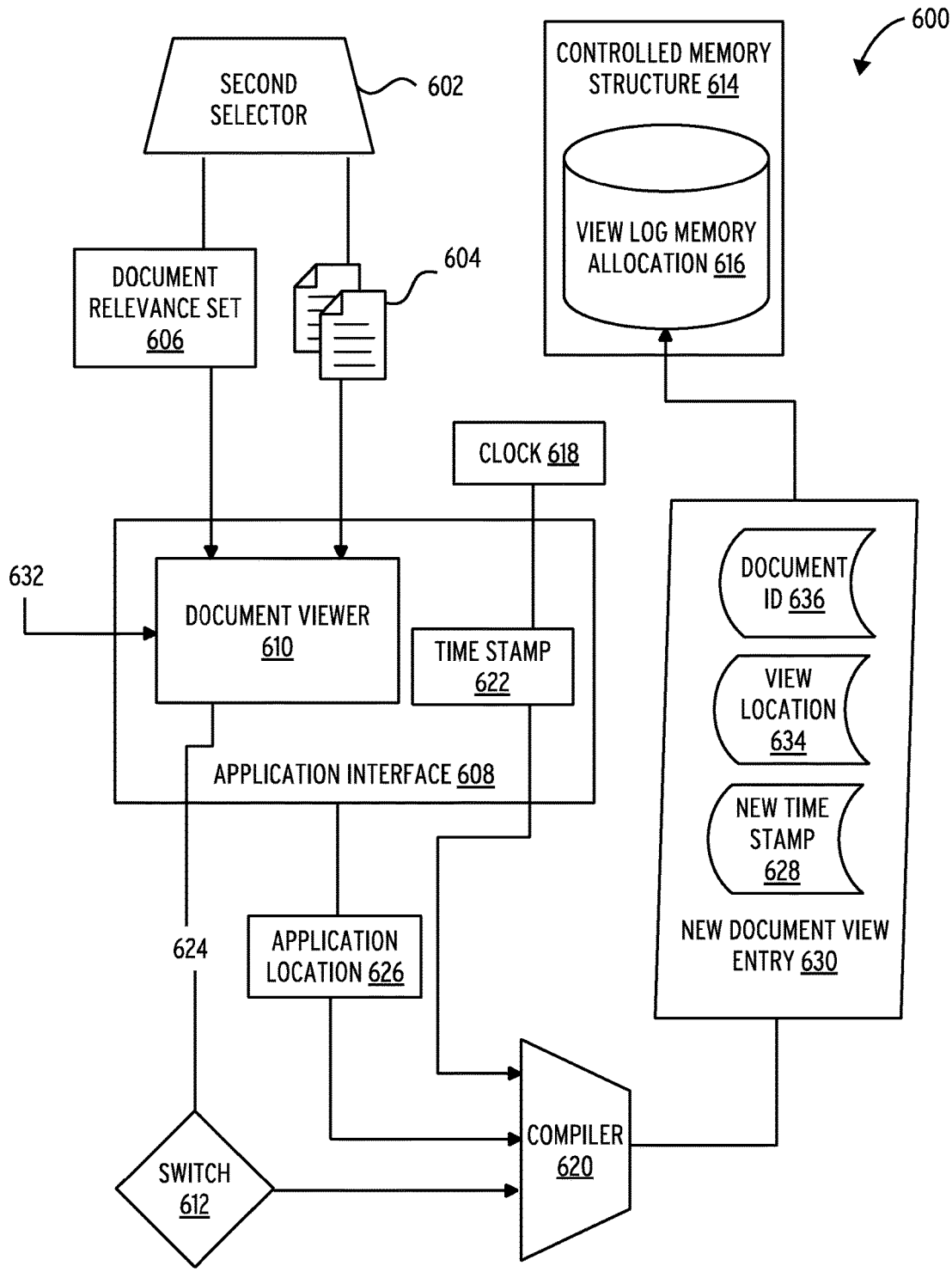
FIG. 6 illustrates an embodiment of a new document view entry compiler subsystem 600.

FIG. 6 illustrates an embodiment of a new document view entry compiler subsystem 600. The new document view entry compiler subsystem 600 comprises a second selector 602, a controlled memory structure 614, an application interface 608, a switch 612, a clock 618, and a compiler 620. The application interface 608 comprises a document viewing 632, a document viewer 610, an application location 626, and a time stamp 622 from the clock 618. The document viewer 610 comprises a document relevance set 606 and a plurality of documents 604. The switch 612 comprises a document view signal 624. The controlled memory structure 614 comprises a view log memory allocation 616. The new document view entry 630 comprises a matching document identifiers 636, a view location 634, and a new time stamp 628.

Figure 7:
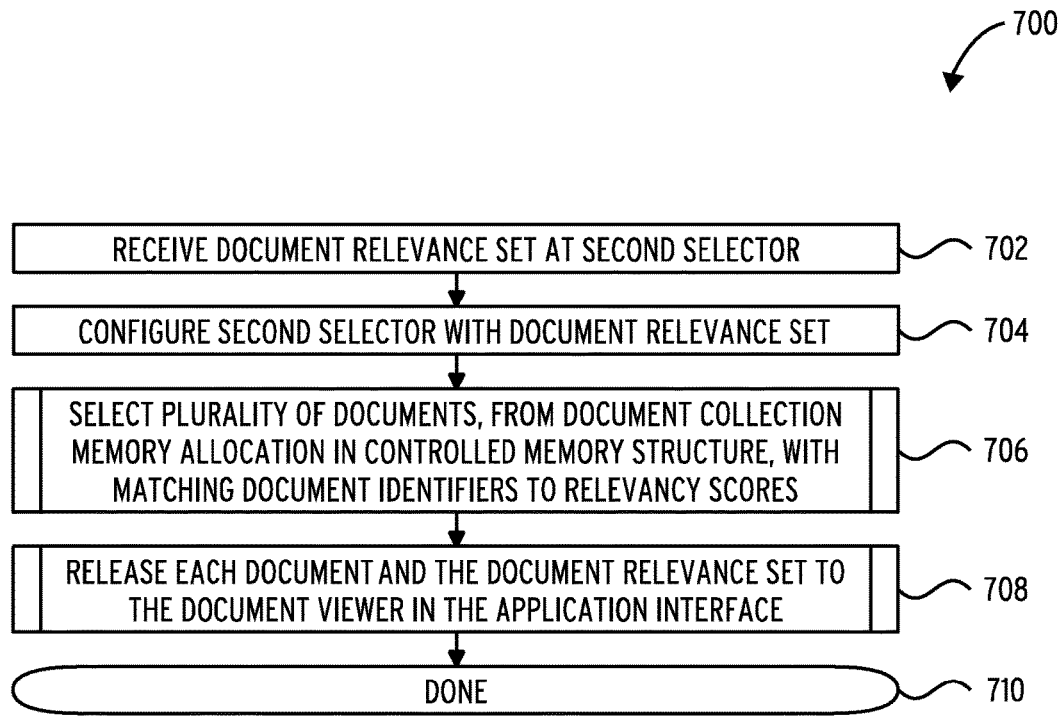
FIG. 7 illustrates an embodiment of a second selector sub process 700.
Figure 8:
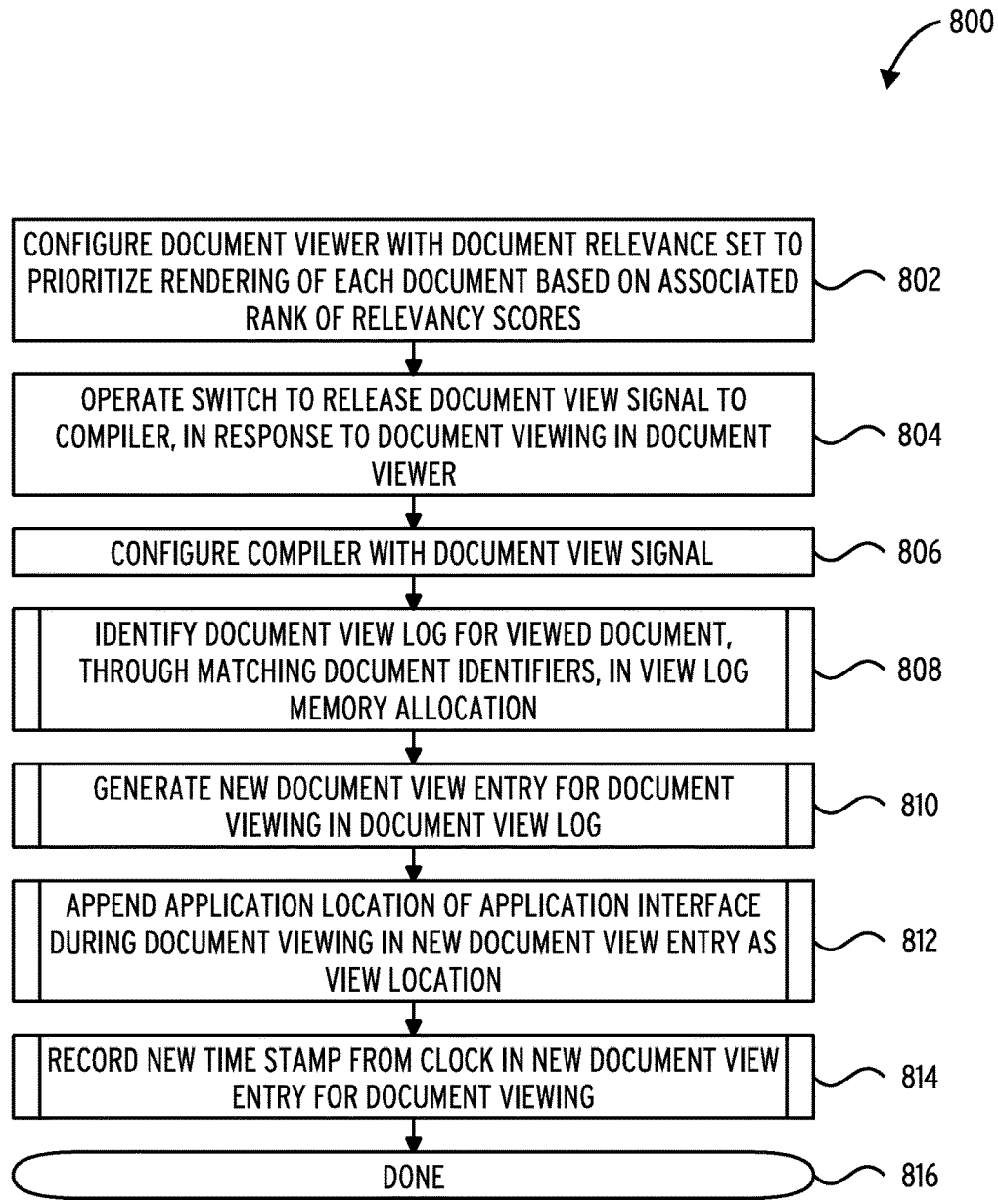
FIG. 8 illustrates an embodiment of a new document view entry generation sub process 800.

The new document view entry compiler subsystem 600 may be operated in accordance with the process described in FIG. 7 and FIG. 8.

FIG. 7 illustrates an embodiment of a second selector sub process 700. In block 702, second selector sub process 700 receives the document relevance set at the second selector. In block 704, second selector sub process 700 configures the second selector with the document relevance set. In subroutine block 706, second selector sub process 700 selects the plurality of documents, from a document collection memory allocation in the controlled memory structure, with matching document identifiers to the relevancy scores. In subroutine block 708, second selector sub process 700 releases each document and the document relevance set to the document viewer in the application interface. In done block 710, second selector sub process 700 ends.

FIG. 8 illustrates an embodiment of a new document view entry generation sub process 800. In block 802, new document view entry generation sub process 800 configures the document viewer with the document relevance set to prioritize rendering of each document based on associated rank of the relevancy scores. In block 804, new document view entry generation sub process 800 operates the switch to release a document view signal to a compiler, in response to a document viewing in the document viewer. In block 806, new document view entry generation sub process 800 configures the compiler with the document view signal. In subroutine block 808, new document view entry generation sub process 800 identifies a document view log for a viewed document, through the matching document identifiers, in the view log memory allocation. In subroutine block 810, new document view entry generation sub process 800 generates a new document view entry for the document viewing in the document view log. In subroutine block 812, new document view entry generation sub process 800 appends the application location of the application interface during the document viewing in the new document view entry as the view location. In subroutine block 814, new document view entry generation sub process 800 records a new time stamp from a clock in the new document view entry for the document viewing. In done block 816, new document view entry generation sub process 800 ends.

Figure 9:
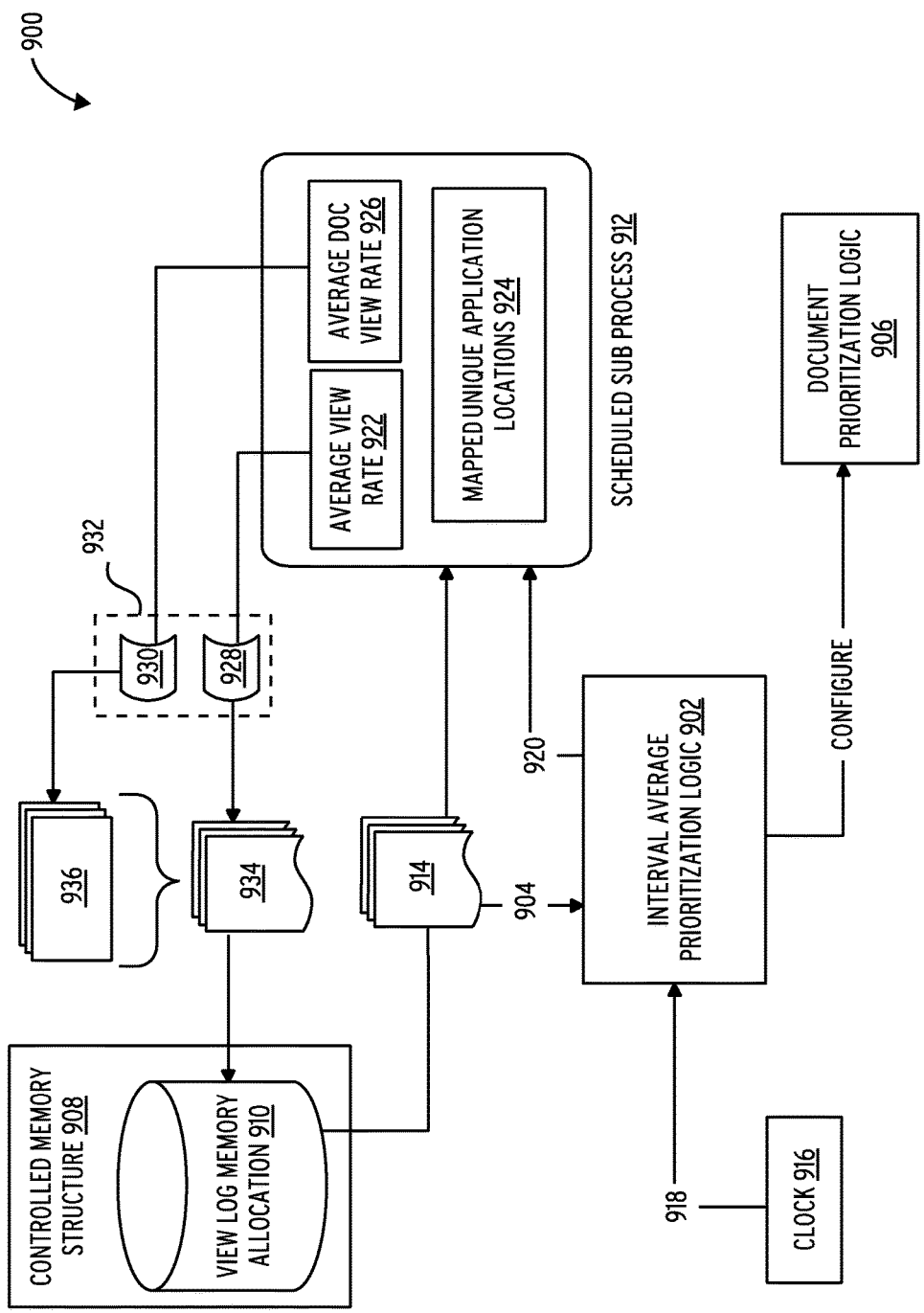
FIG. 9 illustrates an embodiment of an interval average prioritization logic sub system 900.

FIG. 9 illustrates an embodiment of an interval average prioritization logic sub system 900. The interval average prioritization logic sub system 900 comprises a scheduled sub process 912, a controlled memory structure 908, an interval average prioritization logic 902, a document prioritization logic 906, and a clock 916. The controlled memory structure 908 comprises a view log memory allocation 910. The view log memory allocation 910 comprises document view logs 914. The document view logs 914 comprise unique application locations 904. The clock 916 comprises interval lapse 918. The interval average prioritization logic 902 comprises a sub process activation control 920. The scheduled sub process 912 comprises mapped unique application locations 924 of the document view logs 914. The scheduled sub process 912 comprises average view rate 922 and an average document view rate 926. The view log memory allocation 910 comprises a document view logs 934. The document view logs 934 comprise document view entries 936. The document view logs 934 and the document view entries 936 comprise an interval average sets 932. The interval average sets 932 comprises a current interval average document view rate 930 and a current interval average view rate 928.

Figure 10:
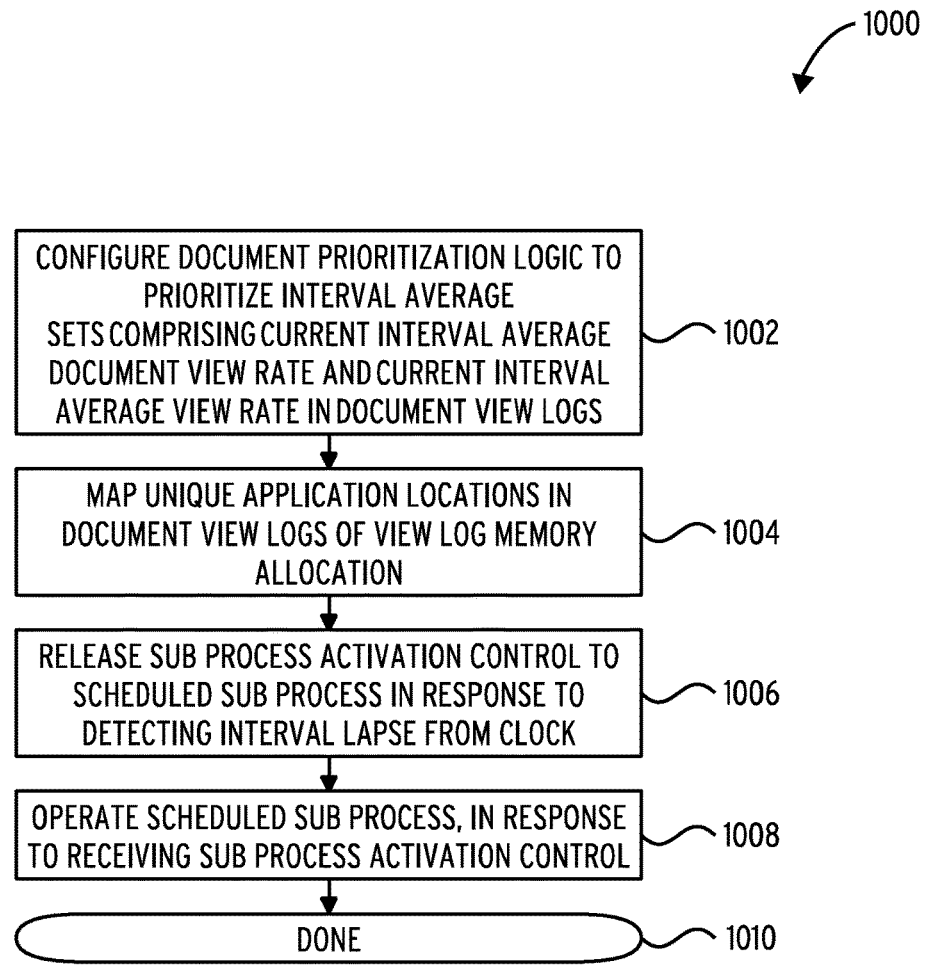
FIG. 10 illustrates an embodiment of an interval average prioritization logic sub process 1000.
Figure 11:
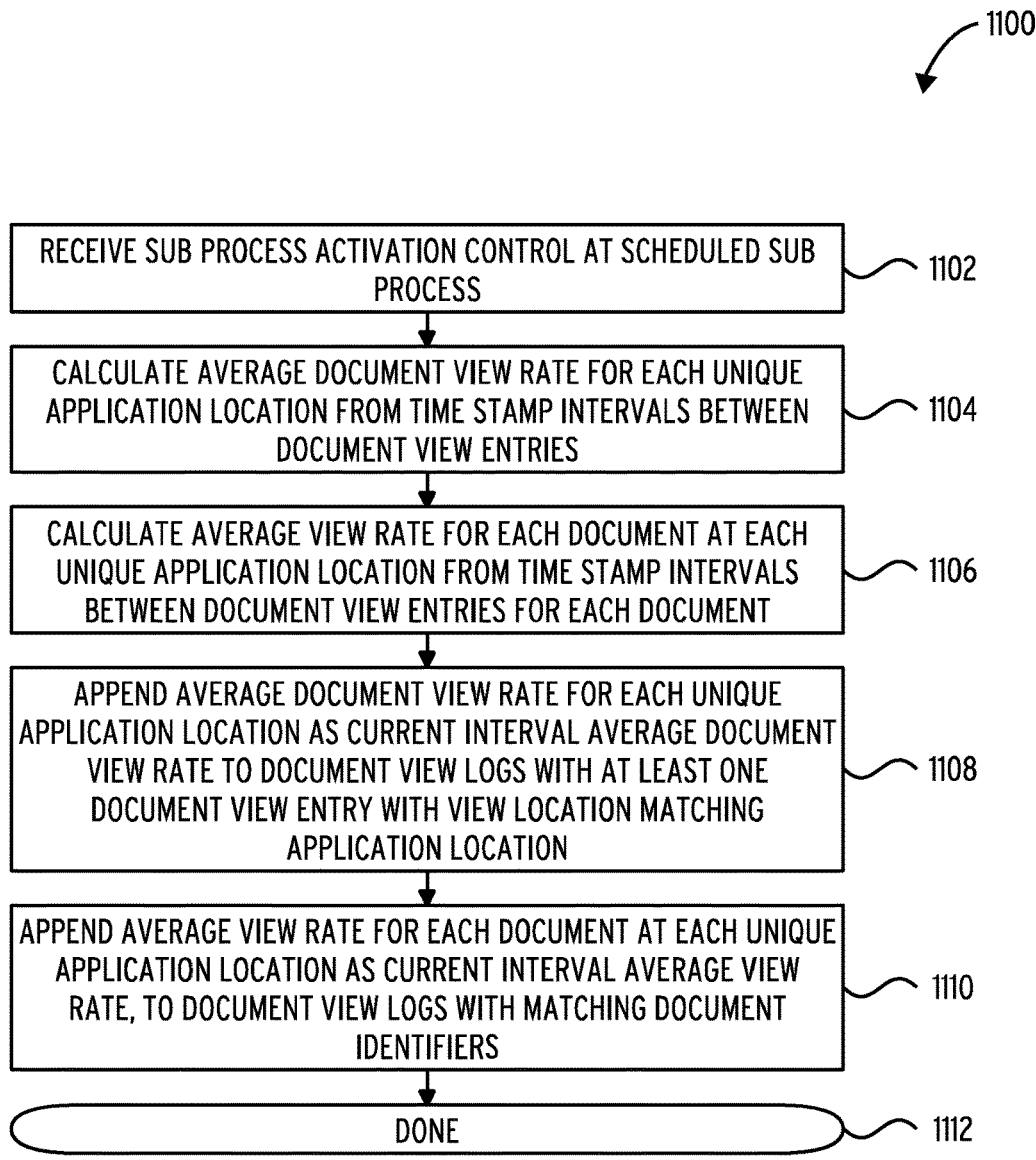
FIG. 11 illustrates an embodiment of a scheduled sub process 1100.

The interval average prioritization logic sub system 900 may be implemented in accordance with the process described in FIG. 10 and FIG. 11.

FIG. 10 illustrates an embodiment of interval average prioritization logic sub process 1000. In block 1002, interval average prioritization logic sub process 1000 configures the document prioritization logic to prioritize interval average sets comprising a current interval average document view rate and a current interval average view rate in the document view logs. In block 1004, interval average prioritization logic sub process 1000 maps unique application locations in the document view logs of the view log memory allocation. In block 1006, interval average prioritization logic sub process 1000 releases a sub process activation control to a scheduled sub process in response to detecting an interval lapse from the clock. In block 1008, interval average prioritization logic sub process 1000 operates the scheduled sub process, in response to receiving the sub process activation control. In done block 1010, interval average prioritization logic sub process 1000 ends.

FIG. 11 illustrates an embodiment of a scheduled sub process 1100. In block 1102, scheduled sub process 1100 receives the sub process activation control at scheduled sub process. In block 1104, scheduled sub process 1100 calculates the average document view rate for each unique application location from the time stamp intervals between the document view entries. In block 1106, scheduled sub process 1100 calculates the average view rate for each document at each unique application location from the time stamp intervals between the document view entries for each document. In block 1108, scheduled sub process 1100 appends the average document view rate for each unique application location as the current interval average document view rate to the document view logs with at least one document view entry with the view location matching the application location. In block 1110, scheduled sub process 1100 appends the average view rate for each document at each unique application location as the current interval average view rate, to the document view logs with the matching document identifiers. In done block 1112, scheduled sub process 1100 ends.

Figure 12:
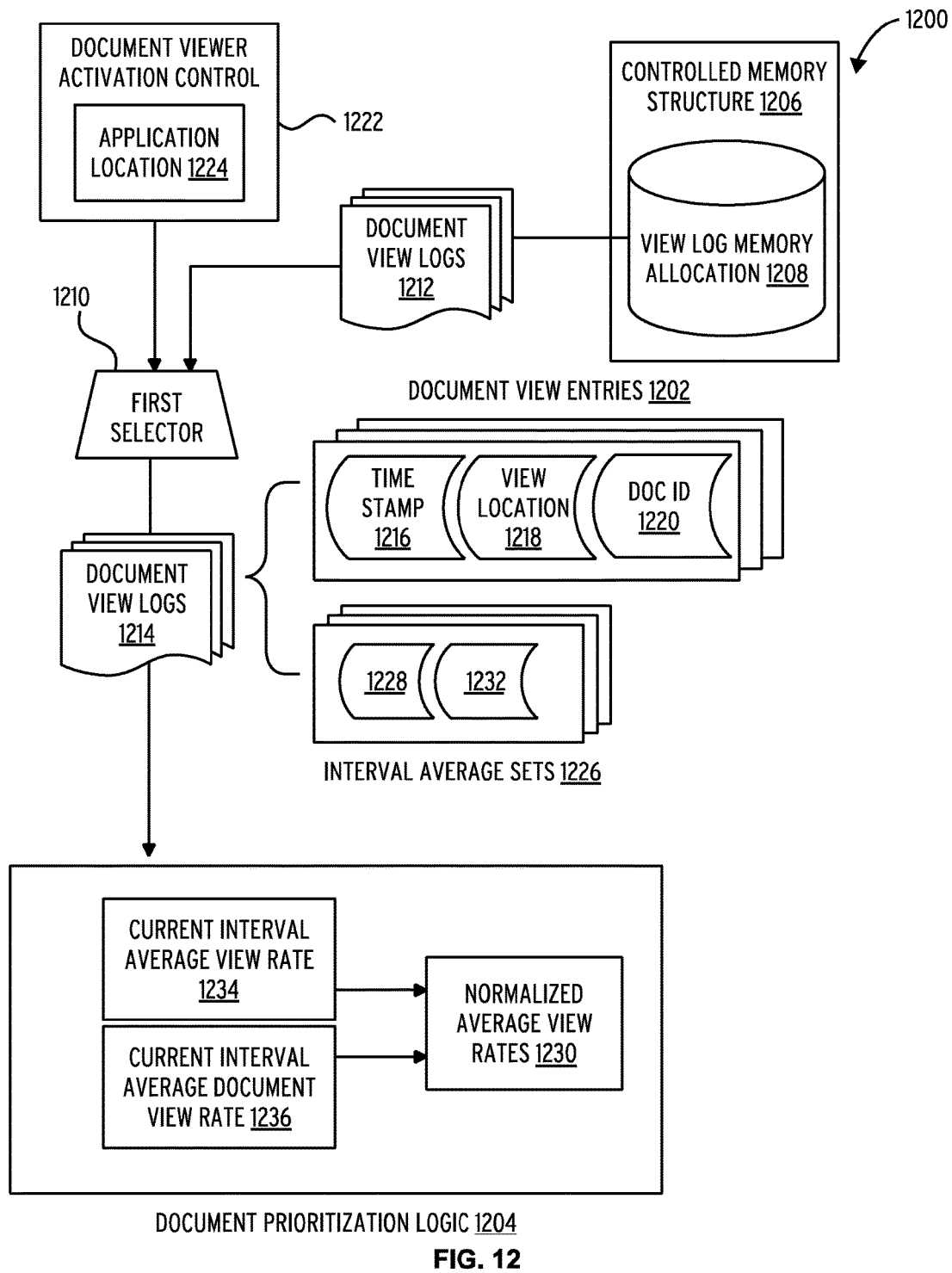
FIG. 12 illustrates an embodiment of an interval average set prioritized document prioritization logic sub system 1200.

FIG. 12 illustrates an embodiment of an interval average set prioritized document prioritization logic sub system 1200. The interval average set prioritized document prioritization logic sub system 1200 comprises a controlled memory structure 1206, a document viewer activation control 1222, a first selector 1210, and a document prioritization logic 1204. The controlled memory structure 1206 comprises a view log memory allocation 1208. The view log memory allocation 1208 comprises document view logs 1212. The document viewer activation control 1222 comprises an application location 1224. The first selector 1210 comprises selected document view logs 1214. The selected document view logs 1214 comprise document view entries 1202 and interval average sets 1226. The interval average sets 1226 comprise current interval average document view rate 1228 and current interval average view rate 1232. Each of the document view entries 1202 comprise a time stamp 1216, a matching view location 1218, and a document identifier 1220. The document prioritization logic 1204 comprises a current interval average view rate 1234 for the application location, a current interval average document view rate 1236 for each document, and a normalized average view rates 1230.

Figure 13:
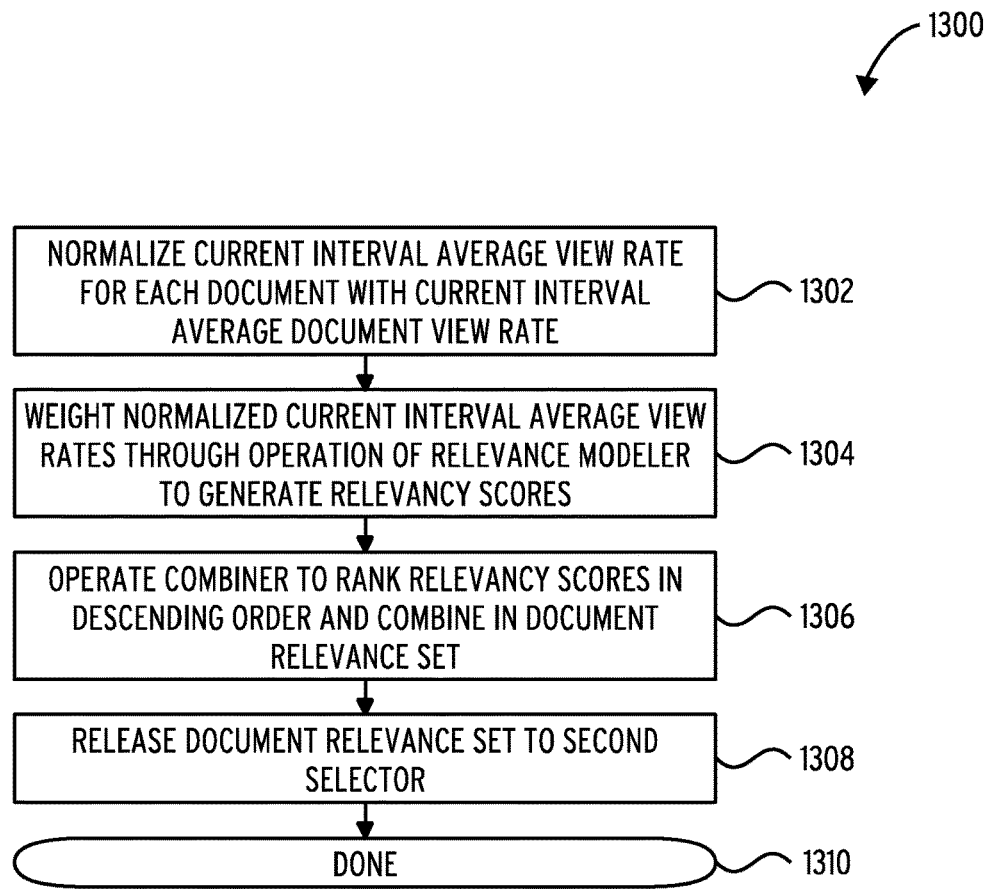
FIG. 13 illustrates an embodiment of an interval average prioritized document prioritization logic sub process 1300.

The interval average set prioritized document prioritization logic sub system 1200 may be implemented in accordance with the process described in FIG. 13.

FIG. 13 illustrates an embodiment of an interval average prioritized document prioritization logic sub process 1300. In block 1302, interval average prioritized document prioritization logic sub process 1300 normalizes the current interval average view rate for each document with the current interval average document view rate. In block 1304, interval average prioritized document prioritization logic sub process 1300 weights normalized current interval average view rates through operation of the relevance modeler to generate the relevancy scores. In block 1306, interval average prioritized document prioritization logic sub process 1300 operates the combiner to rank the relevancy scores in descending order and combine in the document relevance set. In block 1308, interval average prioritized document prioritization logic sub process 1300 releases the document relevance set to the second selector. In done block 1310, interval average prioritized document prioritization logic sub process 1300 ends.

Figure 14:
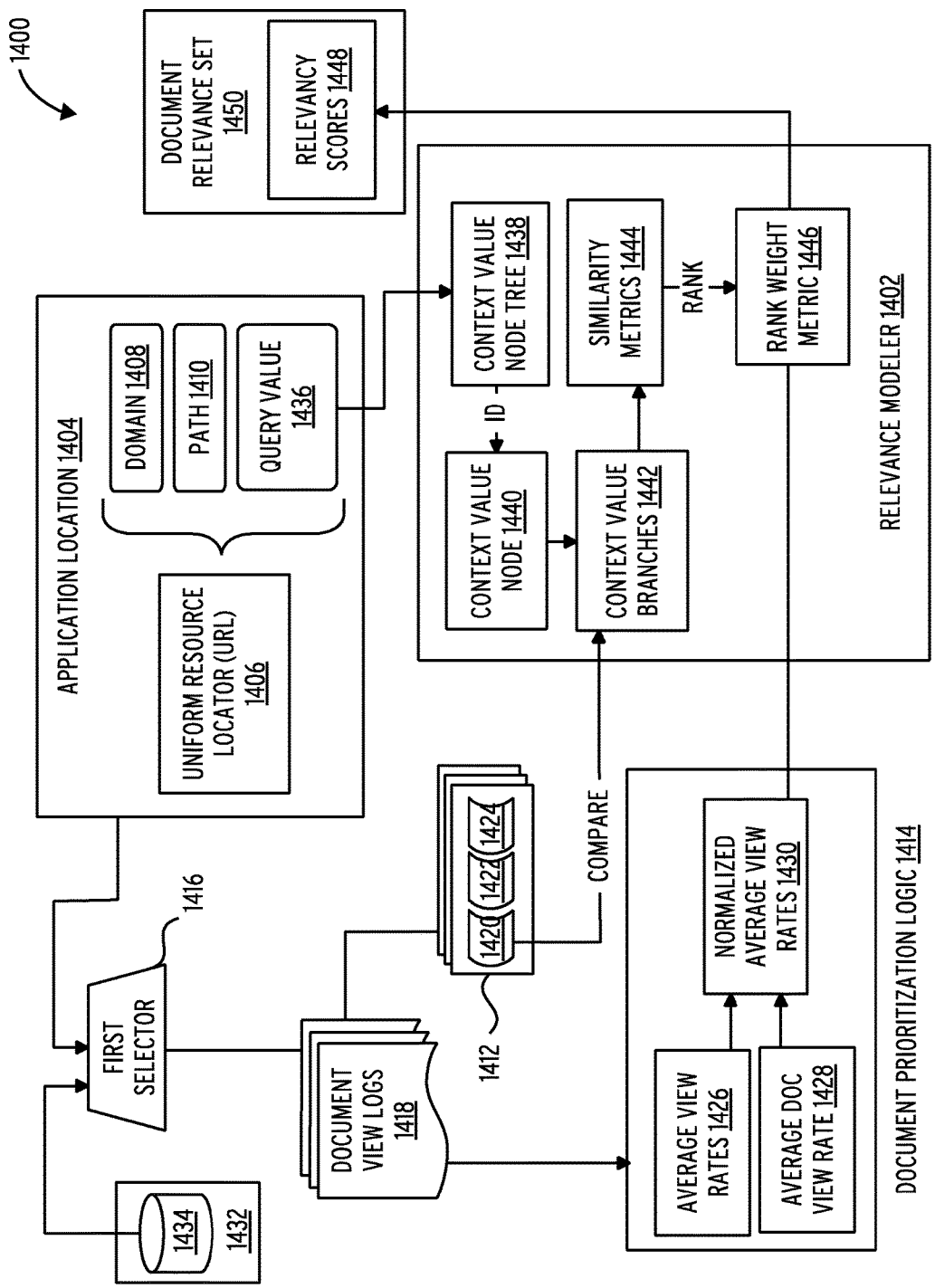
FIG. 14 illustrates an embodiment of the relevance modeler sub system 1400.

FIG. 14 illustrates an embodiment of a relevance modeler sub system 1400. The 1400 comprises a document relevance set 1450, an application location 1404, a relevance modeler 1402, a controlled memory structure 1432, a first selector 1416, and a document prioritization logic 1414. The application location 1404 comprises a uniform resource locator (URL) 1406 comprising a domain 1408, a path 1410, and a query value 1436. The controlled memory structure 1432 comprises a view log memory allocation 1434. The first selector 1416 comprises selected document view logs 1418. The selected document view logs 1418 comprise document view entries 1412 each comprising document identifier 1420, a time stamp 1422, and a view location 1424. The document prioritization logic 1414 comprises average view rates 1426, average document view rate 1428, and normalized average view rates 1430. The relevance modeler 1402 comprises a context value node 1440, a context value node tree 1438, a context value branches 1442, a similarity metrics 1444, a rank weight metric 1446. The document relevance set 1450 comprises a relevancy scores 1448.

Figure 15:
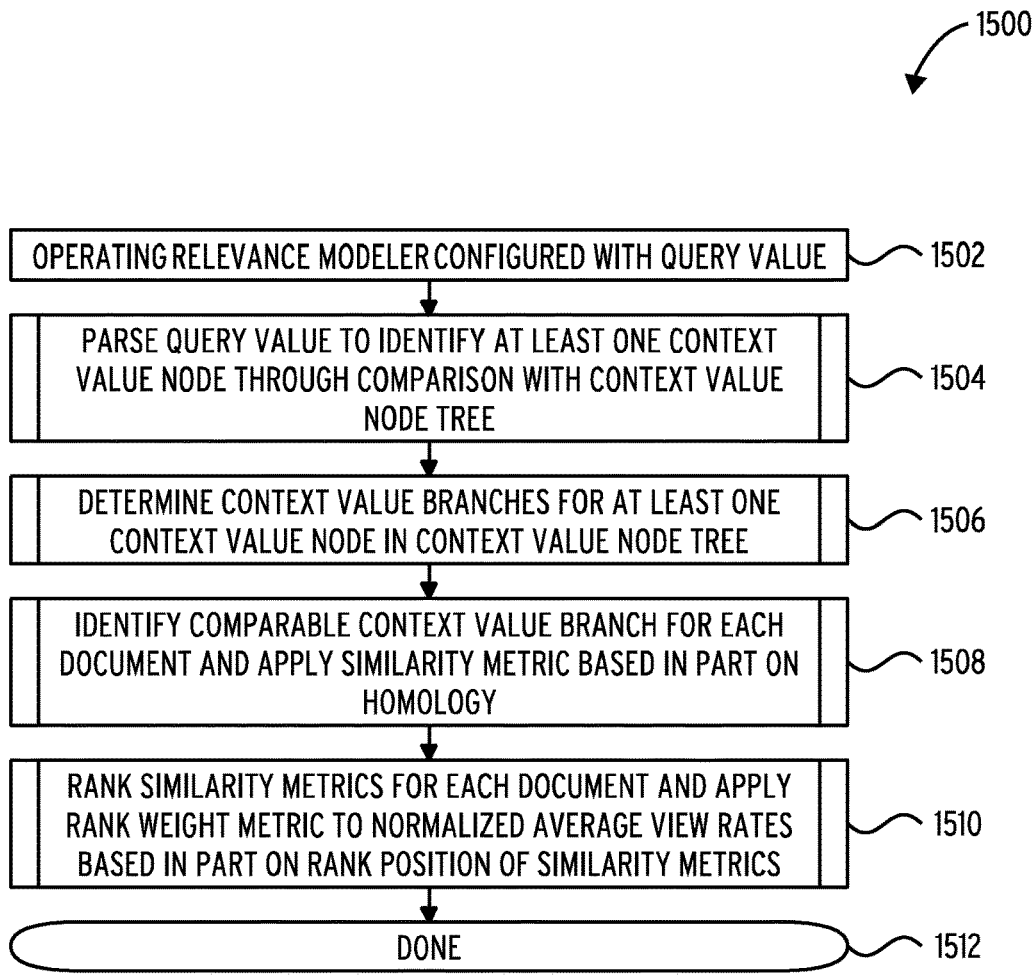
FIG. 15 illustrates an embodiment of a relevance modeler operation sub process 1500.

The relevance modeler sub system 1400 may be implemented in accordance with the process described in FIG. 15.

FIG. 15 illustrates an embodiment of a relevance modeler operation sub process 1500. In block 1502, relevance modeler operation sub process 1500 operates a relevance modeler configured with the query value. In subroutine block 1504, relevance modeler operation sub process 1500 parses the query value to identify at least one context value node through comparison with a context value node tree. In subroutine block 1506, relevance modeler operation sub process 1500 determines context value branches for the at least one context value node in the context value node tree. In subroutine block 1508, relevance modeler operation sub process 1500 identifies a comparable context value branch for each document and applies a similarity metric based in part on homology. In subroutine block 1510, relevance modeler operation sub process 1500 ranks similarity metrics for each document and applies rank weight metric to the normalized average view rates based in part on rank position of the similarity metrics. In done block 1512, relevance modeler operation sub process 1500 ends.

Figure 16:
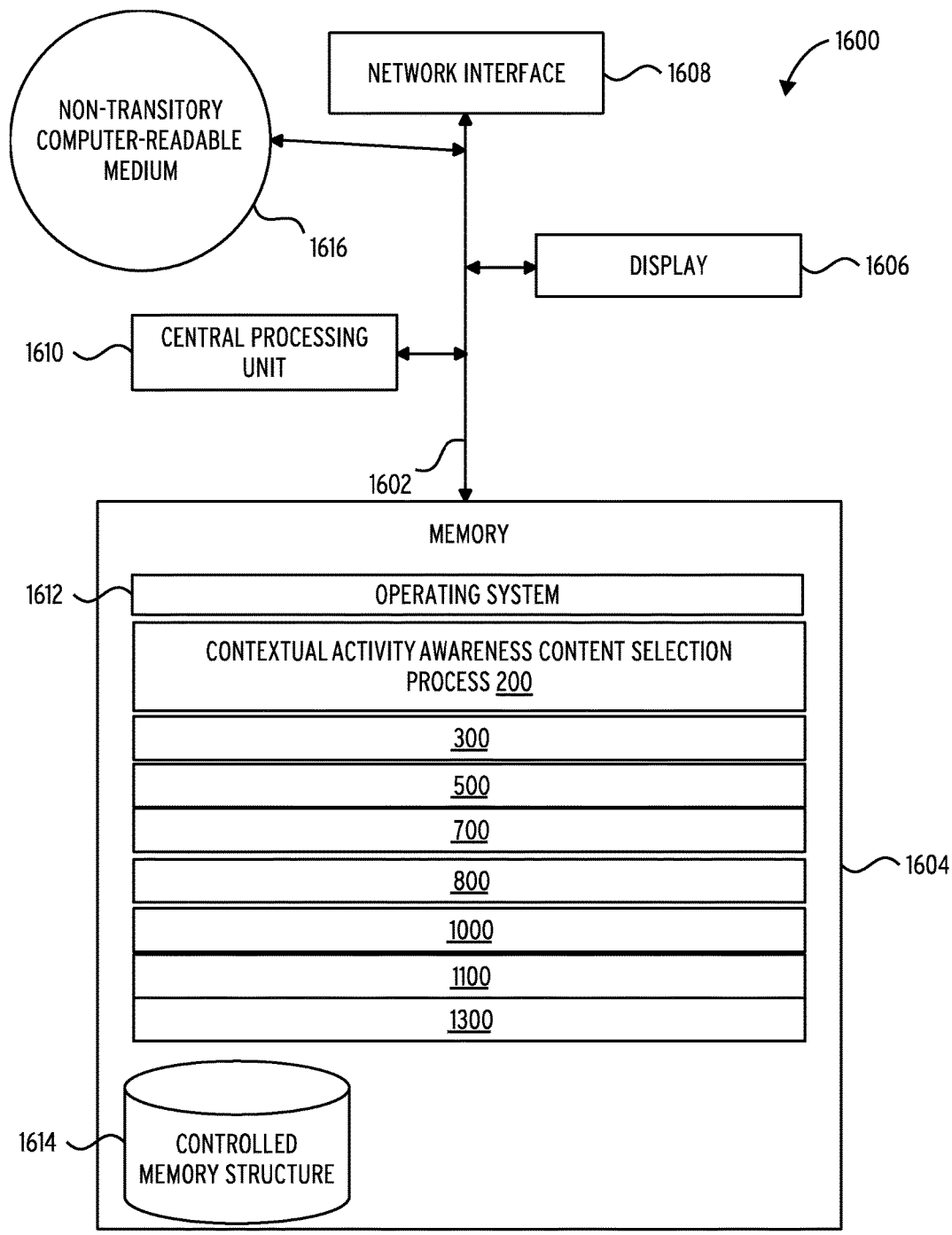
FIG. 16 illustrates an embodiment of a system 1600.

FIG. 16 illustrates several components of an exemplary system 1600 in accordance with one embodiment. In various embodiments, system 1600 may include a desktop PC, server, workstation, mobile phone, laptop, tablet, set-top box, appliance, or other computing device that is capable of performing operations such as those described herein. In some embodiments, system 1600 may include many more components than those shown in FIG. 16. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1600 may comprise one or more physical and/or logical devices that collectively provide the functionalities described herein. In some embodiments, system 1600 may comprise one or more replicated and/or distributed physical or logical devices.

In some embodiments, system 1600 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1600 includes a bus 1602 interconnecting several components including a network interface 1608, a display 1606, a central processing unit 1610, and a memory 1604.

Memory 1604 generally comprises a random access memory ("RAM") and permanent non-transitory mass storage device, such as a hard disk drive or solid-state drive. Memory 1604 stores an operating system 1612, a contextual activity awareness content selection process 200, a first selector sub process 300, a document prioritization logic sub process 500, a second selector sub process 700, a new document view entry generation sub process 800, an interval average prioritization logic sub process 1000, a scheduled sub process 1100, and an interval average prioritized document prioritization logic sub process 1300.

These and other software components may be loaded into memory 1604 of system 1600 using a drive mechanism (not shown) associated with a non-transitory computer-readable medium 1616, such as a floppy disc, tape, DVD/CD-ROM drive, memory card, or the like.

Memory 1604 also includes controlled memory structure 1614. In some embodiments, system 1600 may communicate with controlled memory structure 1614 via network interface 1608, a storage area network ("SAN"), a high-speed serial bus, and/or via the other suitable communication technology.

In some embodiments, controlled memory structure 1614 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment). Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A method comprising:
   activating a document viewer through an application interface;
   determining an application location;
   selecting document view logs from a view log memory allocation, each of the document view logs associated with a document identifier, the document view logs each comprising document view entries, the document view entries each comprising a time stamp and view location matching the application location;
   releasing the document view logs to document prioritization logic; and
   configuring the document prioritization logic with the document view logs to:
      determine a document view rate for the application location from time stamp intervals between the document view entries;
      determine a view rate for each document of a plurality of documents at the application location from the time stamp intervals between the document view entries for each of the plurality of documents;
      normalize the view rate for each of the documents with the document view rate for the application location, to generate normalized view rates;
      weight the normalized view rates through operation of a relevance modeler to generate relevancy scores;
      rank the relevancy scores in descending order and combine the relevancy scores in a document relevance set; and
      release the document relevance set to a selector operable to:
         select the plurality of documents, from a document collection memory allocation, with matching document identifiers to the relevancy scores; and
         release each of the documents and the document relevance set to the document viewer in the application interface.

2. The method of claim 1, further comprising:
   configuring the document viewer with the document relevance set to prioritize rendering of each of the documents based on associated rank of the relevancy scores; and
   in response to a document viewing in the document viewer:
      identifying a document view log for a viewed document, through the matching document identifiers;
      generating a new document view entry for the document viewing in the document view log;
      appending the application location of the application interface during the document viewing in the new document view entry as the view location; and
      recording a new time stamp from a clock in the new document view entry.

3. The method of claim 2, further comprising:
   operating interval prioritization logic to:

configure the document prioritization logic to prioritize interval sets comprising a current interval document view rate and a current interval view rate in the document view logs;

map unique application locations in the document view logs of the view log memory allocation;

release a sub process activation control to a scheduled sub process in response to detecting an interval lapse from the clock; and operate the scheduled sub process, in response to receiving the sub process activation control, to:

calculate the document view rate for each unique application location from the time stamp intervals between the document view entries;

calculate the view rate for each document at each unique application location from the time stamp intervals between the document view entries for each document;

append the document view rate for each unique application location as the current interval document view rate to the document view logs with at least one document view entry with the view location matching the application location; and append the view rate for each document at each unique application location as the current interval view rate, the current interval view rate appended to the document view logs with the matching document identifiers.

4. The method of claim 3 further comprising:

configuring the document prioritization logic with the document view logs to:

normalize the current interval view rate for each document with the current interval document view rate;

weight normalized current interval view rates through operation of the relevance modeler to generate the relevancy scores;

operate the combiner to combine and rank the relevancy scores in descending order in the document relevance set; and release the document relevance set to the selector.

5. The method of claim 1, where in the application location comprises a uniform resource locator (URL).

6. The method of claim 5 further comprising:

configuring the relevance modeler with the query value, to:

parse the query value to identify at least one context value node through comparison with a context value node tree;

determine context value branches for the at least one context value node in the context value node tree;

identify a comparable context value branch for each document and apply a similarity metric; and rank similarity metrics for each document and apply rank weight metric to the normalized view rates based in part on rank position of the similarity metrics.

7. A non-transitory computer-readable storage medium comprising instructions that when executed by a computer processor result in:

activating a document viewer through an application interface;

determining an application location;

selecting document view logs from a view log memory allocation, each of the document view logs associated with a document identifier, the document view logs each comprising document view entries, the document view entries each comprising a time stamp and view location matching the application location;

releasing the document view logs to document prioritization logic;

configuring the document prioritization logic with the document view logs to:

determine an document view rate for the application location from time stamp intervals between the document view entries;

determine a view rate for each document of a plurality of documents at the application location from the time stamp intervals between the document view entries for each of the plurality of documents;

normalize the view rate for each document with the document view rate to generate normalized view rates;

weight the normalized view rates through operation of a relevance modeler to generate relevancy scores; and rank the relevancy scores in descending order and combine the relevancy scores in a document relevance set;

releasing the document relevance set to a selector; and operating the selector to:

select the plurality of documents, from a document collection memory allocation, with matching document identifiers to the relevancy scores; and release each document and the document relevance set to the document viewer in the application interface.

8. The non-transitory computer-readable storage medium of claim 7, further comprising instructions that when executed by the processor result in:

configuring the document viewer with the document relevance set to prioritize rendering of each document based on associated rank of the relevancy scores; and in response to a document viewing in the document viewer:

identify a document view log for a viewed document, through the matching document identifiers, in the view log memory allocation;

generate a new document view entry for the document viewing in the document view log;

append the application location of the application interface during the document viewing in the new document view entry as the view location; and record a new time stamp from a clock in the new document view entry.

9. The non-transitory computer-readable storage medium of claim 8, further comprising instructions that when executed by the processor result in:

operating interval prioritization logic to:

configure the document prioritization logic to prioritize interval sets comprising a current interval document view rate and a current interval view rate in the document view logs;

map unique application locations in the document view logs of the view log memory allocation;

release a sub process activation control to a scheduled sub process in response to detecting an interval lapse from the clock; and operate the scheduled sub process, in response to receiving the sub process activation control, to:

calculate the document view rate for each unique application location from the time stamp intervals between the document view entries;

calculate the view rate for each document at each unique application location from the time stamp intervals between the document view entries for each document;

append the document view rate for each unique application location as the current interval document view rate to the document view logs with at least one document view entry with the view location matching the application location; and append the view rate for each document at each unique application location as the current interval view rate, the current interval view rate appended to the document view logs with the matching document identifiers.

10. The non-transitory computer-readable storage medium of claim 9 further comprising instructions that when executed by the processor result in:

configuring the document prioritization logic with the document view logs to:

normalize the current interval view rate for each document with the current interval document view rate;

weight normalized current interval view rates through operation of the relevance modeler to generate the relevancy scores;

operate the combiner to combine and rank the relevancy scores in descending order in the document relevance set; and release the document relevance set to the selector.

11. The non-transitory computer-readable storage medium of claim 7, wherein the application location is a uniform resource locator (URL).

12. The non-transitory computer-readable storage medium of claim 11 further comprising instructions that when executed by the processor result in:

configuring the relevance modeler with the query value, to:

parse the query value to identify at least one context value node through comparison with a context value node tree;

determine context value branches for the at least one context value node in the context value node tree;

identify a comparable context value branch for each document and apply a similarity metric; and rank similarity metrics for each document and apply rank weight metric to the normalized view rates based in part on rank position of the similarity metrics.

\* \* \* \* \*